US012726670B2

(12) United States Patent
Zhu et al.

(10) Patent No.: US 12,726,670 B2
(45) Date of Patent: Sep. 1, 2026

(54) INFORMATION PROCESSING METHOD, ELECTRONIC DEVICE AND PROGRAM PRODUCT

(71) Applicant: Beijing Youzhuju Network Technology Co., Ltd., Beijing (CN)

(72) Inventors: Lin Zhu, Beijing (CN); Xiaojiao Zhong, Beijing (CN)

(73) Assignee: Beijing Youzhuju Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/981,240

(22) Filed: Dec. 13, 2024

(65) Prior Publication Data

US 2026/0089359 A1 Mar. 26, 2026

(30) Foreign Application Priority Data

Sep. 23, 2024 (CN) ........................ 202411328797.8

(51) Int. Cl.
*H04N 21/431* (2011.01)
*H04N 21/2187* (2011.01)
*H04N 21/478* (2011.01)

(52) U.S. Cl.
CPC ..... *H04N 21/4316* (2013.01); *H04N 21/2187* (2013.01); *H04N 21/47815* (2013.01)

(58) Field of Classification Search
CPC ........... H04N 21/2187; H04N 21/4316; H04N 21/47815
See application file for complete search history.

(56) References Cited

U.S. PATENT DOCUMENTS 5,498,003 A * 3/1996 Gechter .................. A63F 13/63 463/31
5,715,416 A * 2/1998 Baker ..................... G06F 16/10 715/744
5,872,575 A * 2/1999 Segal ...................... G06T 15/00 345/473
6,065,042 A * 5/2000 Reimer ................... G06F 16/78 348/E7.071
6,097,393 A * 8/2000 Prouty, IV .......... G06F 3/04815 715/848
6,282,713 B1 * 8/2001 Kitsukawa ......... H04N 21/4784 725/36
6,409,602 B1 * 6/2002 Wiltshire ............ G07F 17/3288 463/16
6,658,662 B1 * 12/2003 Nielsen .................... H04N 7/16 348/E7.054
7,000,242 B1 * 2/2006 Haber .................... G06Q 40/12 725/43

(Continued)

*Primary Examiner* — Michael B. Pierorazio
(74) *Attorney, Agent, or Firm* — BakerHostetler

(57) ABSTRACT

An information processing method, an electronic device, and a program product are provided. The information processing method includes: displaying a first user interface comprising a list of items of a current live streaming channel and an interactive element for a virtual container of the current live streaming channel, the virtual container being used exclusively for holding items of the current live streaming channels; receiving a first user operation on the interactive element; and in response to the first user operation, displaying a second user interface for the virtual container, wherein information about at least one item that has been added to the virtual container is displayed in the second user interface.

20 Claims, 8 Drawing Sheets

(56) References Cited

U.S. PATENT DOCUMENTS 7,054,831 B2* 5/2006 Koenig .................. A63F 13/61 463/16
7,162,197 B2* 1/2007 Kitamura .............. A63H 33/38 715/251
7,664,678 B1* 2/2010 Haber ............... G06Q 30/0639 705/26.9
7,715,642 B1* 5/2010 Collins ................. H04N 19/23 382/284
8,043,156 B2* 10/2011 Ackley .................. A63F 13/79 463/31
8,079,054 B1* 12/2011 Dhawan .............. H04N 21/812 705/14.6
8,221,220 B2* 7/2012 Ackley .................. A63F 13/30 463/31
8,613,020 B2* 12/2013 Knudson ............. H04N 21/482 725/39
8,627,379 B2* 1/2014 Kokenos ........... H04N 21/2543 725/51
8,893,173 B2* 11/2014 Briggs .............. H04N 21/4725 725/32
8,898,719 B2* 11/2014 Poder ................ H04N 21/4112 725/121
8,910,201 B1* 12/2014 Zamiska ............. H04N 21/458 725/60
9,462,340 B1* 10/2016 Mathurin ........... H04N 21/8106
9,516,373 B1* 12/2016 Abecassis .......... H04N 21/4122
9,596,502 B1* 3/2017 Abecassis ........ H04N 21/43074
9,973,827 B2* 5/2018 Walker ............... G06Q 30/0241
10,403,042 B2* 9/2019 Roveta ................ G11B 27/322
2001/0001160 A1* 5/2001 Shoff ................ H04N 21/4312 725/108
2001/0037303 A1* 11/2001 Mizrahi ............... H04N 21/816 348/E7.071
2001/0039571 A1* 11/2001 Atkinson ........... H04N 21/4722 348/E7.071
2001/0053996 A1* 12/2001 Atkinson ........... H04N 21/8126 348/E7.071
2002/0033844 A1* 3/2002 Levy .................... G06F 40/117 715/744
2002/0052746 A1* 5/2002 Handelman ............ G10L 15/22 704/E15.045
2002/0069405 A1* 6/2002 Chapin ........... H04N 21/47205 725/135
2002/0133562 A1* 9/2002 Newnam ............... G06Q 30/02 709/216
2002/0144262 A1* 10/2002 Plotnick .............. H04N 21/458 348/E7.071
2002/0162117 A1* 10/2002 Pearson ............. H04N 21/4758 725/135
2003/0056212 A1* 3/2003 Siegel ................... H04N 5/913 380/278
2003/0149618 A1* 8/2003 Sender .............. G06Q 30/0277 705/26.1
2003/0149975 A1* 8/2003 Eldering ............ H04N 21/4532 348/E7.071
2003/0217210 A1* 11/2003 Carau, Sr. ................ G06F 1/26 710/302
2004/0068536 A1* 4/2004 Demers ................ H04L 69/329 709/201
2004/0073493 A1* 4/2004 Kato ................. H04N 7/17318 348/E7.071
2004/0255322 A1* 12/2004 Meadows .......... H04N 21/2543 725/23
2005/0066352 A1* 3/2005 Herley ............ H04N 21/42203 348/E7.071
2005/0132398 A1* 6/2005 Baran ................... G06Q 30/04 348/E7.071
2005/0144024 A1* 6/2005 Wojton ................. G06Q 50/10 705/319
2005/0267813 A1* 12/2005 Monday ................ H04N 21/47 705/14.69
2006/0123451 A1* 6/2006 Preisman ........... H04N 7/17318 348/E7.071
2006/0184579 A1* 8/2006 Mills ................. H04N 21/4788
2006/0291483 A1* 12/2006 Sela ....................... H04L 69/08 370/401
2007/0271580 A1* 11/2007 Tischer ................. H04H 60/07 725/35
2008/0015864 A1* 1/2008 Ross .................. G10L 15/1822 704/E15.044
2008/0052750 A1* 2/2008 Grunnet-Jepsen ... H04N 21/422 348/E7.071
2008/0089659 A1* 4/2008 Clapper ................. G06F 16/40 386/248
2008/0115161 A1* 5/2008 Kurzion ................ G06Q 30/02 725/62
2008/0115655 A1* 5/2008 Weng .................. G10H 1/0008 84/609
2008/0187279 A1* 8/2008 Gilley ............. H04N 21/43615 386/250
2008/0221986 A1* 9/2008 Soicher ............. G06Q 30/0277 705/14.56
2008/0282283 A1* 11/2008 Hilton ............. H04N 21/47815 725/86
2008/0285940 A1* 11/2008 Kulas ................ H04N 21/4858 386/353
2008/0295129 A1* 11/2008 Laut .................... H04N 21/812 725/34
2009/0094632 A1* 4/2009 Newnam .......... H04N 21/43074 725/24
2009/0217316 A1* 8/2009 Gupta .................. H04L 65/762 705/14.66
2009/0281908 A1* 11/2009 Wong ................ H04N 21/2543 705/26.1
2009/0293081 A1* 11/2009 Pirani ............... H04N 21/4334 707/999.003
2009/0299752 A1* 12/2009 Rodriguez ............ G06F 40/242 704/E15.001
2010/0131385 A1* 5/2010 Harrang ............ G06Q 30/0631 705/26.1
2010/0256561 A1* 10/2010 Gillespie, Jr. .......... G01B 7/003 604/151
2010/0275224 A1* 10/2010 Sheng ............... H04N 21/4622 704/251
2010/0283741 A1* 11/2010 Heintze ................ G06F 3/0238 345/173
2010/0332570 A1* 12/2010 Roberts ........... H04N 21/25866 707/957
2011/0137753 A1* 6/2011 Moehrle ............... G06V 20/49 725/60
2011/0138326 A1* 6/2011 Roberts ............. G06Q 30/0243 715/808
2011/0167456 A1* 7/2011 Kokenos ......... H04N 21/47815 725/60
2011/0276334 A1* 11/2011 Wang ..................... G10H 1/361 704/E21.001
2011/0289536 A1* 11/2011 Poder .................. H04N 21/658 725/95
2011/0310580 A1* 12/2011 Leung ................ G06F 3/04886 361/807
2012/0016678 A1* 1/2012 Gruber .................... G06F 3/167 704/E21.001
2012/0084811 A1* 4/2012 Thompson .......... H04N 21/812 725/34
2012/0084812 A1* 4/2012 Thompson ....... H04N 21/44204 725/34
2012/0110620 A1* 5/2012 Kilar .................... H04N 21/812 725/34
2012/0204207 A1* 8/2012 Clapper .............. H04N 21/858 725/38
2013/0212477 A1* 8/2013 Averbuch ............ H04N 21/812 715/719
2013/0304795 A1* 11/2013 Kang ................ H04N 21/4781 709/202
2014/0109161 A1* 4/2014 Chang ............. H04N 21/42204 725/110

(56) References Cited

U.S. PATENT DOCUMENTS

2014/0229980 A1* 8/2014 Bill ........................ H04N 21/43
725/35
2014/0250477 A1* 9/2014 Kang ............... H04N 21/42222
725/110
2014/0278834 A1* 9/2014 Lautz ................. G06Q 30/0245
705/12
2016/0077573 A1* 3/2016 Lee ......................... H04L 12/12
713/310
2017/0374417 A1* 12/2017 Hernandez-Mondragon ...............
H04N 21/6143
2019/0028770 A1* 1/2019 van Kempen ..... H04N 21/6125
2019/0090025 A1* 3/2019 Chesson .............. H04N 21/466
2021/0127170 A1* 4/2021 Chesson .......... H04N 21/47815
2022/0021943 A1* 1/2022 Dormieux .......... H04N 21/8113

* cited by examiner

INFORMATION PROCESSING METHOD, ELECTRONIC DEVICE AND PROGRAM PRODUCT

CROSS REFERENCE TO RELATED APPLICATIONS

This application claims the priority to Chinese Application No. 202411328797.8 filed on Sep. 23, 2024, the disclosure of which is incorporated herein by reference in its entity.

BACKGROUND

With the advancement of video and communication technology, an increasing number of people are purchasing items from live streaming channels using electronic devices with live streaming applications. On the live streaming channels, anchors serve as shopping guides, providing detailed introductions to various items by highlighting their features, advantages, and uses. Viewers can directly observe the appearance, texture, and real-world effects of the products through the live stream. Live streaming shopping thus offers an enhanced shopping experience.

During live streaming shopping, users can directly purchase items on the current live streaming channel, or can add the items to a shopping cart and then enter the cart page for checkout when deciding to order. Market research has shown that most users are more likely to purchase items from the current live streaming channel over those already in the carts. This presents new challenges for live streaming shopping, particularly in terms of interface and interaction design.

SUMMARY

In view of the above, embodiments of the present disclosure introduce a virtual container exclusively for holding items from a current live streaming channel, along with corresponding interfaces and human-machine interactions.

In accordance with a first aspect of the present disclosure, there is provided an information processing method. The method comprises: displaying a first user interface comprising a list of items of a current live streaming channel and an interactive element for a virtual container of the current live streaming channel, the virtual container being used exclusively for holding items of the current live streaming channels; receiving a first user operation on the interactive element; and in response to the first user operation, displaying a second user interface for the virtual container, wherein information about at least one item that has been added to the virtual container is displayed in the second user interface.

In accordance with a second aspect of the present disclosure, there is provided an electronic device, comprising: a processing unit; and a memory coupled to the processing unit and having instructions stored thereon, wherein the instructions, when executed by the processing unit, cause the electronic device to perform actions, the actions comprising: displaying a first user interface comprising a list of items of a current live streaming channel and an interactive element for a virtual container of the current live streaming channel, the virtual container being used exclusively for holding items of the current live streaming channels; receiving a first user operation on the interactive element; and in response to the first user operation, displaying a second user interface for the virtual container, wherein information about at least one item that has been added to the virtual container is displayed in the second user interface.

In accordance with a third aspect of the present disclosure, there is provided a computer program product tangibly stored in a computer storage medium and comprising computer executable instructions, wherein the computer executable instructions, when executed by a device, cause the device to perform the following actions: displaying a first user interface comprising a list of items of a current live streaming channel and an interactive element for a virtual container of the current live streaming channel, the virtual container being used exclusively for holding items of the current live streaming channels; receiving a first user operation on the interactive element; and in response to the first user operation, displaying a second user interface for the virtual container, wherein information about at least one item that has been added to the virtual container is displayed in the second user interface.

In accordance with a fourth aspect of the present disclosure, there is provided an information processing apparatus, comprising: a display unit configured to display a first user interface comprising a list of items of a current live streaming channel and an interactive element for a virtual container of the current live streaming channel, the virtual container being used exclusively for holding items of the current live streaming channels; and a user-operation receiving unit configured to receive a first user operation on the interactive element; wherein the display unit is further configured, in response to the first user operation, to display a second user interface for the virtual container, wherein information about at least one item that has been added to the virtual container is displayed in the second user interface.

The Summary is to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Throughout the drawings, the same or similar reference symbols refer to the same or similar components.

DETAILED DESCRIPTION OF EMBODIMENTS

Figure 1:
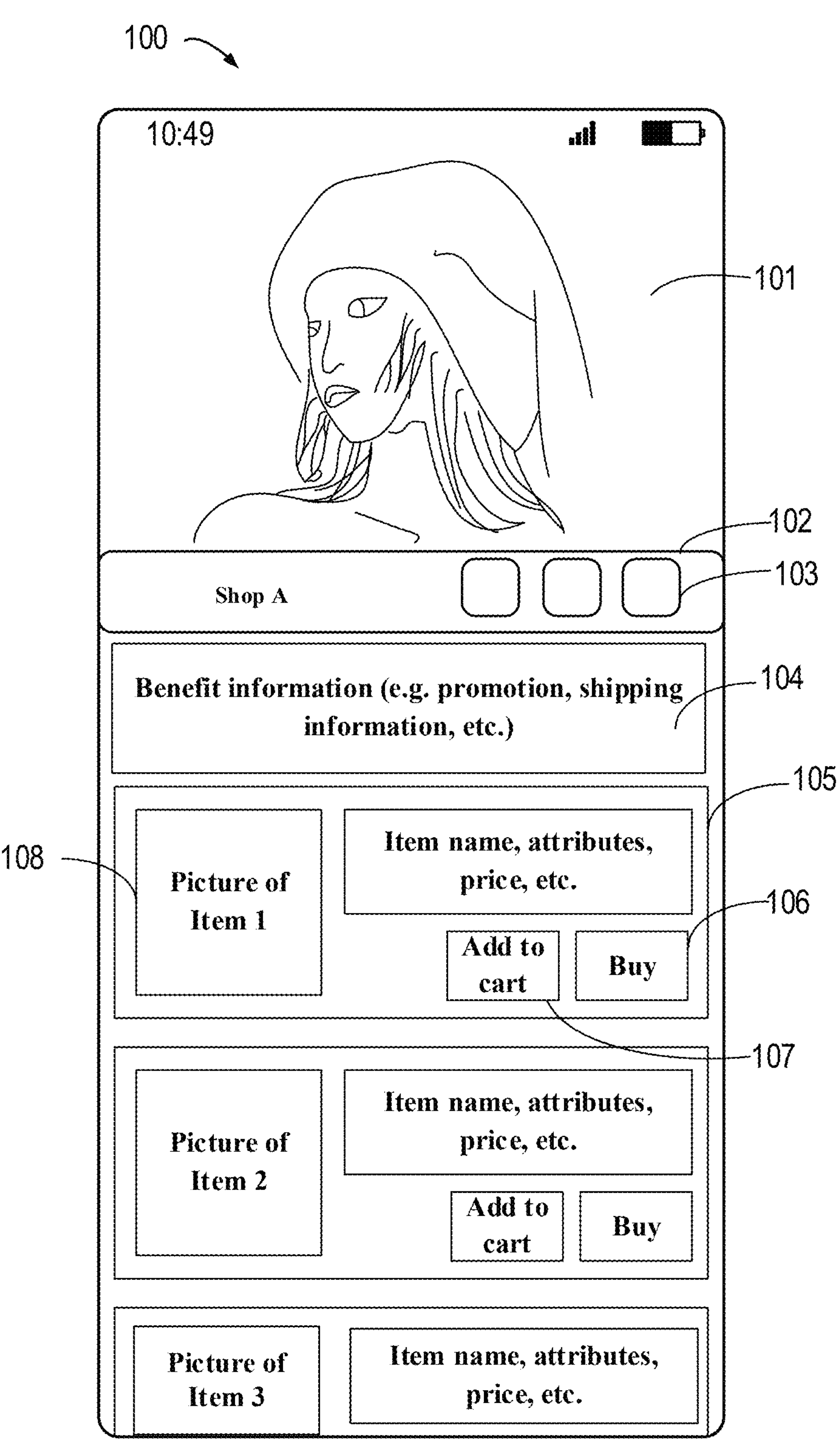
FIG. 1 illustrates an example interface for live streaming shopping according to some embodiments of the present disclosure.

Reference now will be made to some example implementations to describe the present disclosure. As would be appreciated, those implementations are described only to enable those skilled in the art to better understand and thus implement the present disclosure, without suggesting any limitation to the scope of the present disclosure.

Prior to applying the technical solution according to various embodiments of the present disclosure, the user should be informed of the type, scope of use, and use scenario of the personal information involved in an appropriate manner according to the pertinent provisions of the laws and the regulations thereof, and user authorization should be obtained.

For example, in response to receiving an active request from a user, prompt information is sent to the user to explicitly inform the user that the requested operation would acquire and use the user's personal information. Therefore, according to the prompt information, the user may decide on his/her own whether to provide the personal information to software or hardware, such as electronic devices, applications, servers or storage media that perform operations of the technical solution of the present disclosure.

As an optional implementation, without limitation, in response to receiving an active request from a user, the method of sending prompt information to the user may, for example, include a pop-up window, where the prompt information may be presented in the form of text in the pop-up window. In addition, the pop-up window may also carry a select control for the user to choose to "agree" or "disagree" to provide the personal information to the electronic device.

The above process of notifying and obtaining the user authorization is only illustrative, not formulating any limitation to the implementations of the present disclosure, and other methods compliant with the provisions of the relevant laws and regulations can also be applied to the implementations of the present disclosure.

Hereinafter, reference will be made to the accompanying drawings to describe in detail the embodiments of the present disclosure. Although some embodiments of the present disclosure are depicted in the drawings, it would be appreciated that the present disclosure could be implemented in various forms and should not be construed as being limited to the embodiments described herein. Rather, those embodiments are provided for a more thorough and complete understanding of the present disclosure. It is to be noted that the drawings and embodiments of the present disclosure are provided only exemplarily, rather than used for limiting the protection scope of the present disclosure.

As described herein, the term "includes" or similar expressions are to be read as open-ended terms that mean "includes, but is not limited to." The term "based on" is to be read as "based at least in part on." The term "an embodiment" or "the embodiment" is to be read as "at least one embodiment." The terms "first," "second," and the like may refer to different objects or the same object unless explicitly indicated otherwise. Other definitions, explicit and implicit, may be included below.

A smart phone is taken herein as an example to present an example user interface. However, those skilled in the art would appreciate that the embodiments of the present disclosure can also be applied to other devices having different aspect ratios, for example, tablets, laptops, desktop computers, wearable devices with screens, devices with foldable screens, and the like. In addition, the interfaces described herein are only provided illustratively, where some elements may be omitted or provided in a different number, and more elements not shown may also be included. Moreover, the interfaces according to the embodiments of the present disclosure may have different layouts than those shown in the drawings, and the respective elements may also be arranged at different positions. The present disclosure is not limited in those aspects.

The inventor found that the existing interactive design of live streaming shopping lacks an effective way to display to users important information—such as item quantity, total price, promotional details, and other relevant data—about items added to the cart from the current live streaming channel. Through marketing research, the inventor found that users are more likely to purchase items from the current live streaming channel when they make purchases through their carts, rather than through direct purchasing methods (e.g., by clicking or tapping the control 106). At this point, the information that captures most of the user's attention is information related to items that are added from the current live streaming channel to the cart. Therefore, the absence of the information about shopping in the current live streaming channel goes against user habits, thus leading to in a poor user experience.

In view of the above, the present disclosure provides a cart dedicated to a live streaming channel, which is used exclusively for including items of the current live streaming channel and not including items of other live streaming channels. For example, when a live activity initiated by Shop A is being conducted on the current live streaming channel, the proposed cart only includes items from the Shop A. Such cart may be referred to as a live cart or a mini cart in the present disclosure. The embodiments of the present disclosure further provide interfaces and user interactions based on the live cart, thereby enhancing the user experience in selecting and checking out items through the live cart.

It is worth noting that another cart including all the added items in the live streaming application may also be provided, which may include items from multiple live streaming channels, but not limited to the items from the current live streaming channel. Such cart may be referred to as a full cart. It would be appreciated that checkout via the full cart is also possible, which is not limited in the present disclosure. The term "cart" herein refers to the live cart unless indicated otherwise.

Hereinafter, references are made to FIGS. 1-9 to describe in detail the embodiments of the present disclosure.

FIG. 1 illustrates an example interface 100 for live streaming shopping according to some embodiments of the present disclosure. When a user participates in a live streaming shopping activity using an electronic device, the device can display an interface 100 shown in FIG. 1. For example, the user can enter a live streaming channel via a video application on the electronic device, so as to watch the anchor describe items. In some implementations, the user can click a shopping icon on the screen to enter the interface 100 as shown in FIG. 1.

The interface 100 includes a live streaming channel area 101 where the user can watch the video stream of the current live streaming channel. The interface 100 further includes a navigation bar 102 that may include information of the current live streaming channel, and one or more interactive controls such as a cart icon 103. In some implementations, the cart icon 103 can be linked to the interface of the live cart such that, when the user clicks or taps the cart icon 103, the electronic device may switch to the interface having the live cart displayed thereon. In some implementations, a total number of items in the live cart can be displayed in, or in vicinity of, the cart icon 103. In some implementations, more additional information can also be displayed in vicinity of the cart icon 103. For example, marketing information is displayed in the form of a bubble. In some implementations, the cart icon 103 can also be linked to the full cart. Alternatively, the navigation bar can display simultaneously the icon of the live cart and the icon of the full cart, where the two may be shown in different images or symbols.

Figure 2:
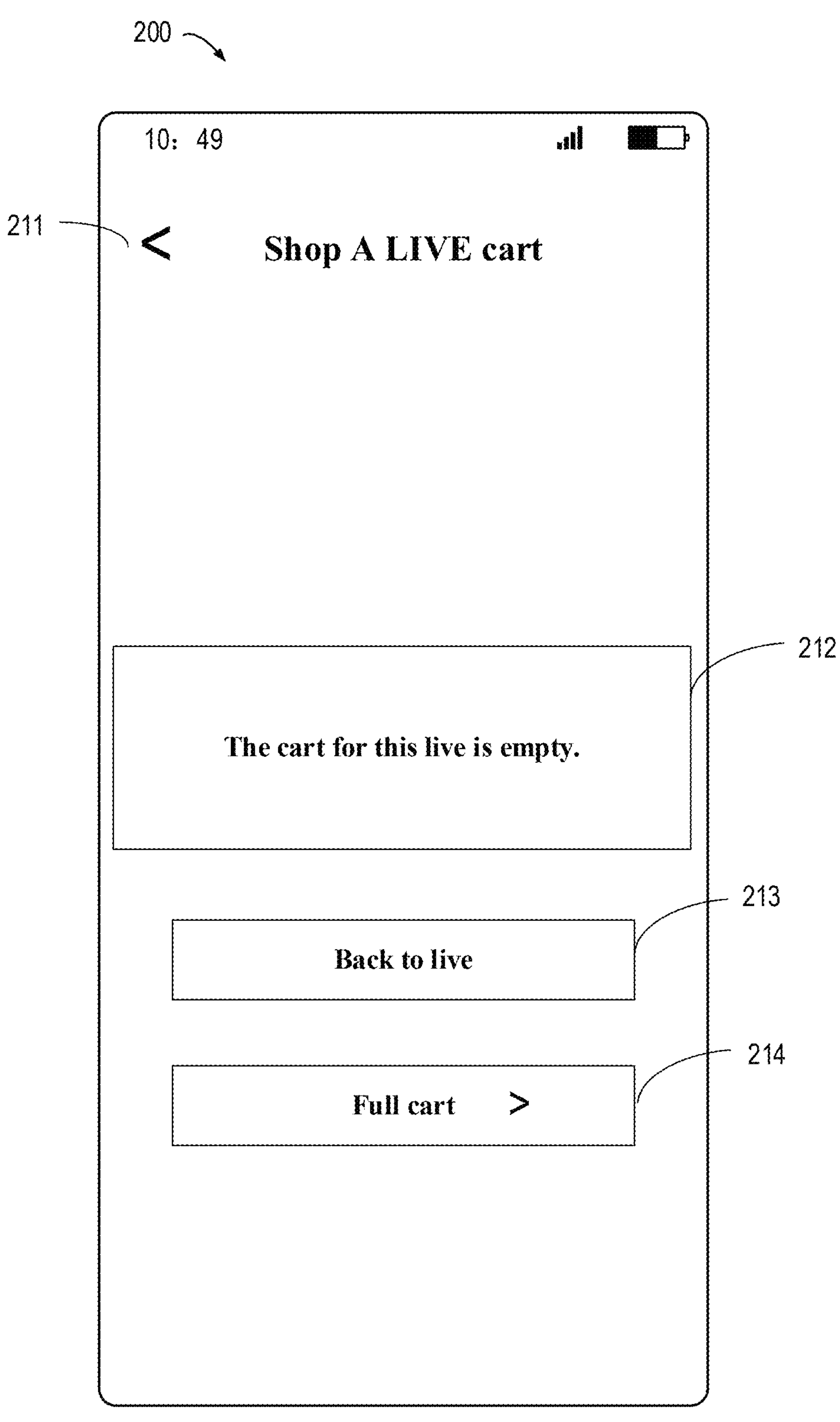
FIG. 2 illustrates an example interface for a live cart according to some embodiments of the present disclosure.

In a case that the cart icon 103 is linked to the cart of the current live streaming channel and no item has been added to the cart, the user can interact with the cart icon 103 to cause the interface to switch to the interface as shown in FIG. 2 which is an example interface 200 displaying thereon that the live cart is empty.

As shown in FIG. 2, the title 211 of the interface 200 indicates that the current interface 200 displays a cart of the shop A (i.e., the current live streaming channel). On the interface 200, an interface element 212 prompts "Cart of current live streaming channel is empty." An interface element 213 may prompt "Back to live streaming channel," and when the user interacts with the interface element 213, the interface 200 may switch back to the interface 100 as shown in FIG. 1. An interface element 214 may be linked to the full cart, and when the user interacts with the interface element 214, the interface 200 may switch to the interface of the full cart to display, to the use, all the items that have been added to the full cart.

Returning to FIG. 1, benefit information 104 about live streaming shopping is presented below the navigation bar 102. The benefit information 104 can arouse user interest to trigger shopping behavior, which may be promotion information, shipping information (e.g., a reduced shipping fee, or free shipping), and the like.

The interface 100 further includes a list of items of the current live streaming channel. As shown therein, Item 1, Item 2, Item 3 or the like are supplied in the current live streaming channel. The user may swipe up and down on the interface 100 to browse more items. On the interface 100, the area 105 includes related information of Item 1, including a picture 108 and a text description (e.g. name, attributes, price, and the like) of Item 1. In some implementations, the area 105 may further include one or more entries of benefit information (not shown) about Item 1.

The area 105 further includes a control 106 for directly purchasing the item, and a control 107 for adding the item to the cart. Upon deciding to purchase the item immediately, the user may click or tap the control 106 to cause the interface 100 to switch to the checkout interface, and thus can purchase the item individually. Upon deciding to add the item to the cart, the user may click or tap the control 107 to add the item to the live cart (correspondingly, to the full cart as well).

In some embodiments, in response to the user clicking or tapping the control 107, an animation of adding the Item 1 to the cart, for example, an animation of the picture 108 of Item 1 flying into the cart icon 103, can be played on the interface 100, while the number of items displayed in or near the cart icon 103 may be updated correspondingly, i.e., increased by 1. Upon deciding to go to the cart for checkout, the user may click or tap the cart icon 103, to cause the interface 100 to switch to the interface for checking out the items in the cart of the current live streaming channel, which will be described with reference to FIG. 4.

Figure 3:
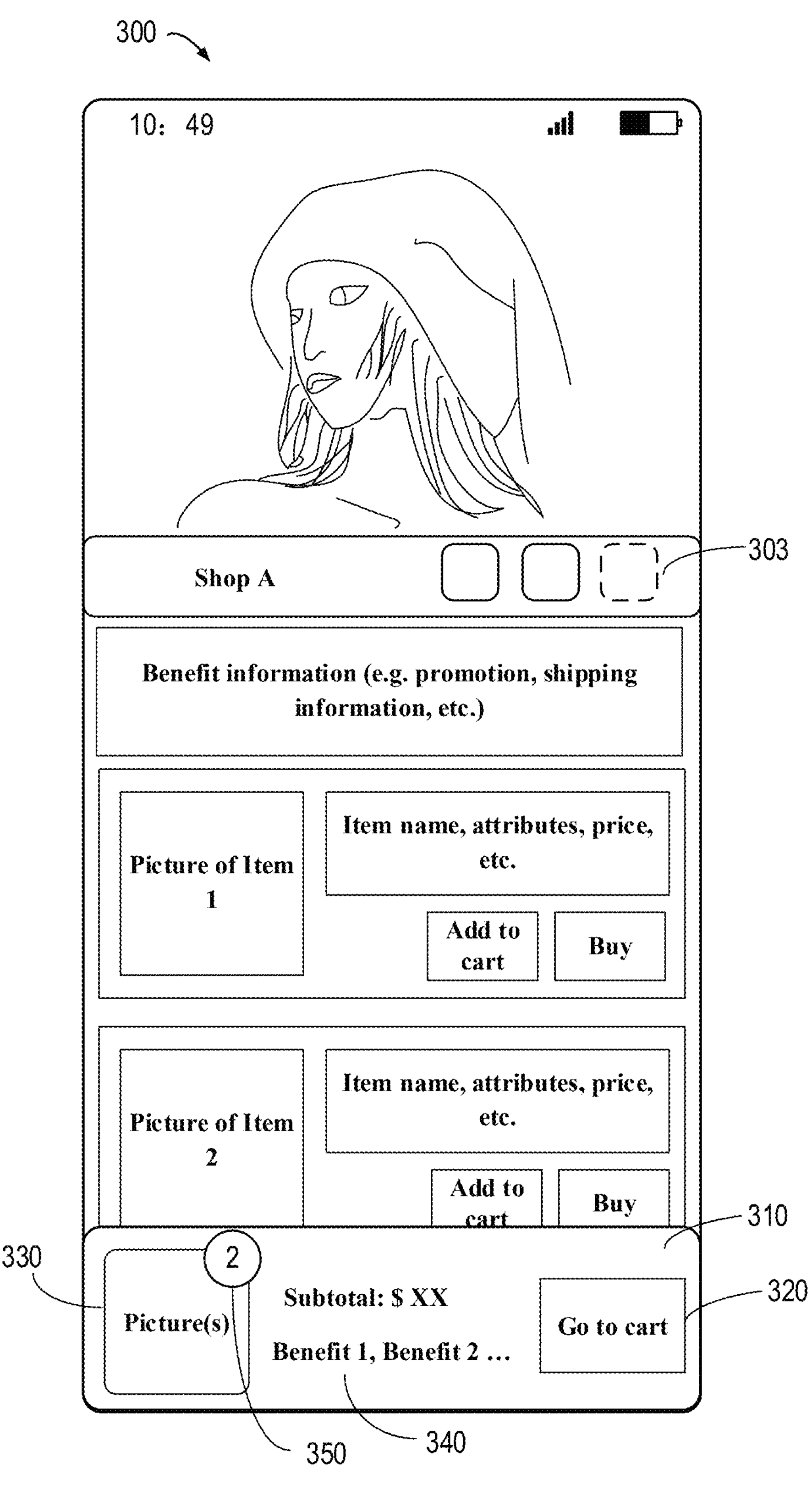
FIG. 3 illustrates an example interface for live streaming shopping according to some embodiments of the present disclosure, including an example of an interactive element for a live cart.

FIG. 3 illustrates an example interface 300 for live streaming shopping according to some embodiments of the present disclosure, including an interactive element 310 for the cart of the current live streaming channel. The user may select an item on the interface 300 to purchase. In some embodiments, if the cart of the current live streaming channel does not contain any item, the interactive element 310 may not be displayed.

In some embodiments, in response to the user clicking a control for adding an item of the current live streaming channel to the cart, for example, the control 107, on the interface 100, the interface 300 can be displayed. For example, the interactive element 310 may slide in from the bottom of the interface 100. Subsequently, the user may continue to perform operations of adding more items to the cart.

As shown therein, the interactive element 310 occupies the bottom of the interface 300, and has a bar shape. The interactive element 310 may be in other forms, for example, it may be displayed at other position of the interface 300, e.g., the left side, the right side, or the top. The interactive element 310 may be of other geometric shape, which is not limited herein.

The interactive element 310 may indicate that at least one item of the current live streaming channel has been added to the cart. As shown therein, the interactive element 310 may include a picture 330 of the item of the current live streaming channel that has been added to the cart. If more than one items have been added to the cart, the pictures can be arranged in a partially overlapping manner. In some implementations, the picture of the most recently added item may be arranged on the top, which intuitively provides the user with the information about the items of the current live streaming channel that have been added to the cart. In some embodiments, when the item is added to the cart, an animation that the picture of the item (e.g. the picture 308 of Item 1) being added to the cart falls into the picture area 330 of the interactive element 310 may be played. This design better aligns with the intuitive feeling of an item being added to the cart. In some implementations, a number 350 of the items that have been added to the cart may be displayed near the picture 330, for example, "2", to indicate that two items (which may be of the same model or different models) are present in the cart.

The interactive element 310 may further include benefit information 340 in the form of text. The benefit information 340 is used for arousing user interest to trigger the action of entering the cart page for consumption. In some embodiments, the benefit information 340 may include a total price, a number, promotion information, and/or shipping information (e.g. a shipping fee, whether to reduce or waive the shipping fee, or the like) of at least one item of the current live streaming channel that has been added to the cart. The interactive element 310 can provide a larger space for displaying additional information such as benefit information.

The interactive element 310 may include a control 320 ("Go to cart") linked to the cart. Upon receiving a user interaction with the control 320, the interface 300 may switch to the interface dedicated to the live cart of the current live streaming channel, for example, the interface 400 as shown in FIG. 4.

The interface 300 may further include a cart icon 303 positioned above the list of items. Upon receiving an interaction operation between the user and the cart icon 303, the interface 300 may also switch to the interface for the cart of the current live streaming channel. In some embodiments, the cart icon may always be displayed, i.e., regardless of being empty or containing any item, the live cart is displayed on the interface (e.g. the icon 103 on the interface 100, or the icon 303 on the interface 300). Alternatively, the cart icon may be displayed (e.g. the icon 103 on the interface 100) only when the live cart is empty; the cart icon 303 may not be displayed on the interface 300 when the cart contains at least one item.

Figure 4:
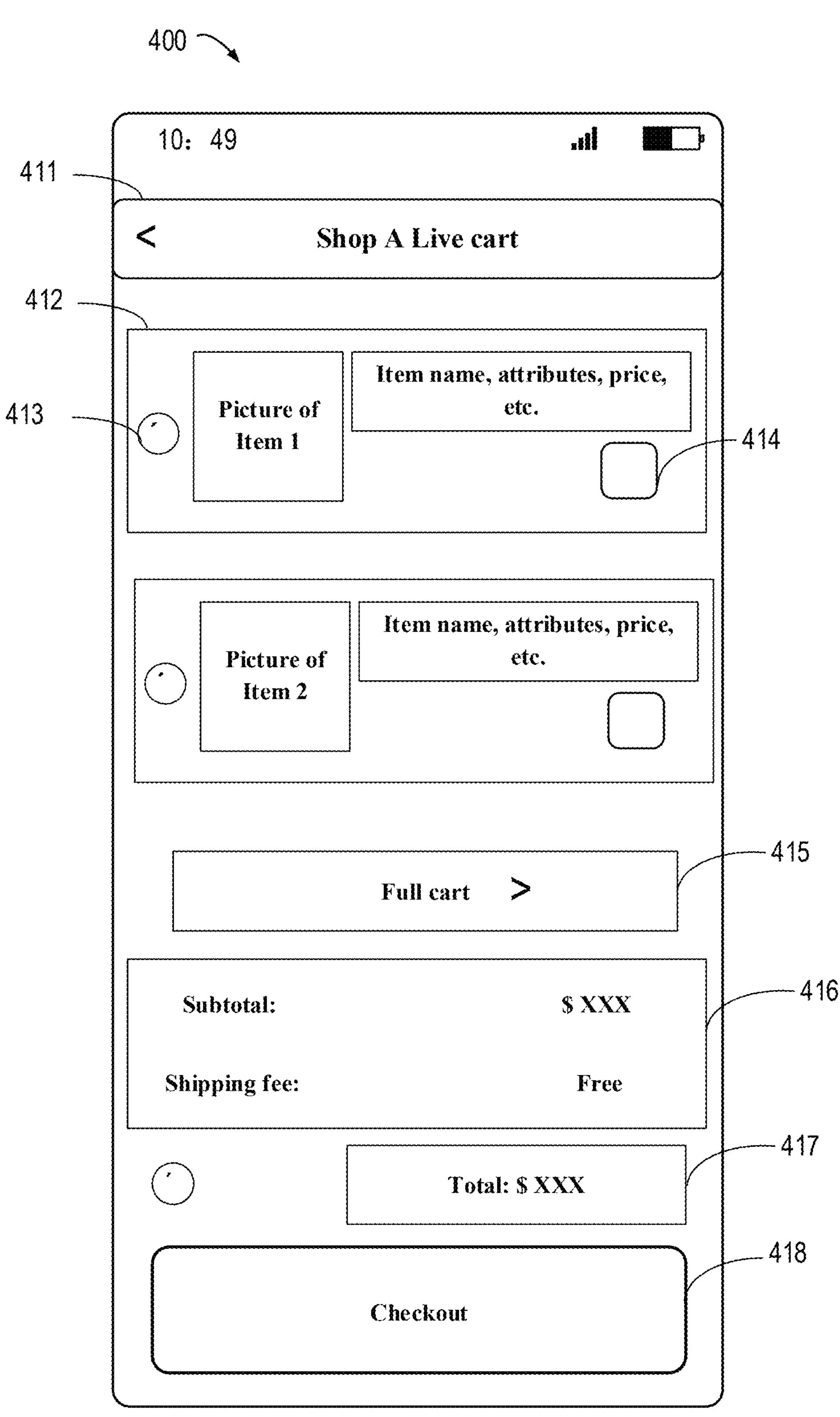
FIG. 4 illustrates an example interface of a live cart according to some embodiments of the present disclosure.

FIG. 4 illustrates an example interface 400 of a live cart according to the embodiments of the present disclosure, where information about items that have been added to the live cart is displayed. In some embodiments, when the user clicks or taps the icon 303 or the control 320, the interface 400 may be displayed.

As shown, information 411 of the current live streaming cart ("Shop A live cart") is displayed on the top of the interface 400. The interface 400 further includes areas 412 for one or more items of the current live streaming channel, where each area 412 includes an individual selection control 413, an individual number adjustment control 414, and detailed information about the item, for example, name, attributes, price, and the like. In a default state after entering the interface 400, all of the controls 413 for all the items may checked to encourage consumption and facilitate a quicker checkout process.

The interface 400 further includes a control 415 linked to the full cart. When the user clicks or taps the control 415, the interface 400 switches to the interface of the full cart, which displays information about items added from all the live streaming channels to the full cart. The interface 400 further includes an area 416 displaying prices of items in the live cart, an area 417 for displaying a total price, and a checkout control 418. The checkout control 418 prompts to check out items of the current live streaming channel. When the user decides to check out and interacts with the checkout control 418, the interface 400 may switch to the checkout interface to check out items in the cart.

Figure 5:
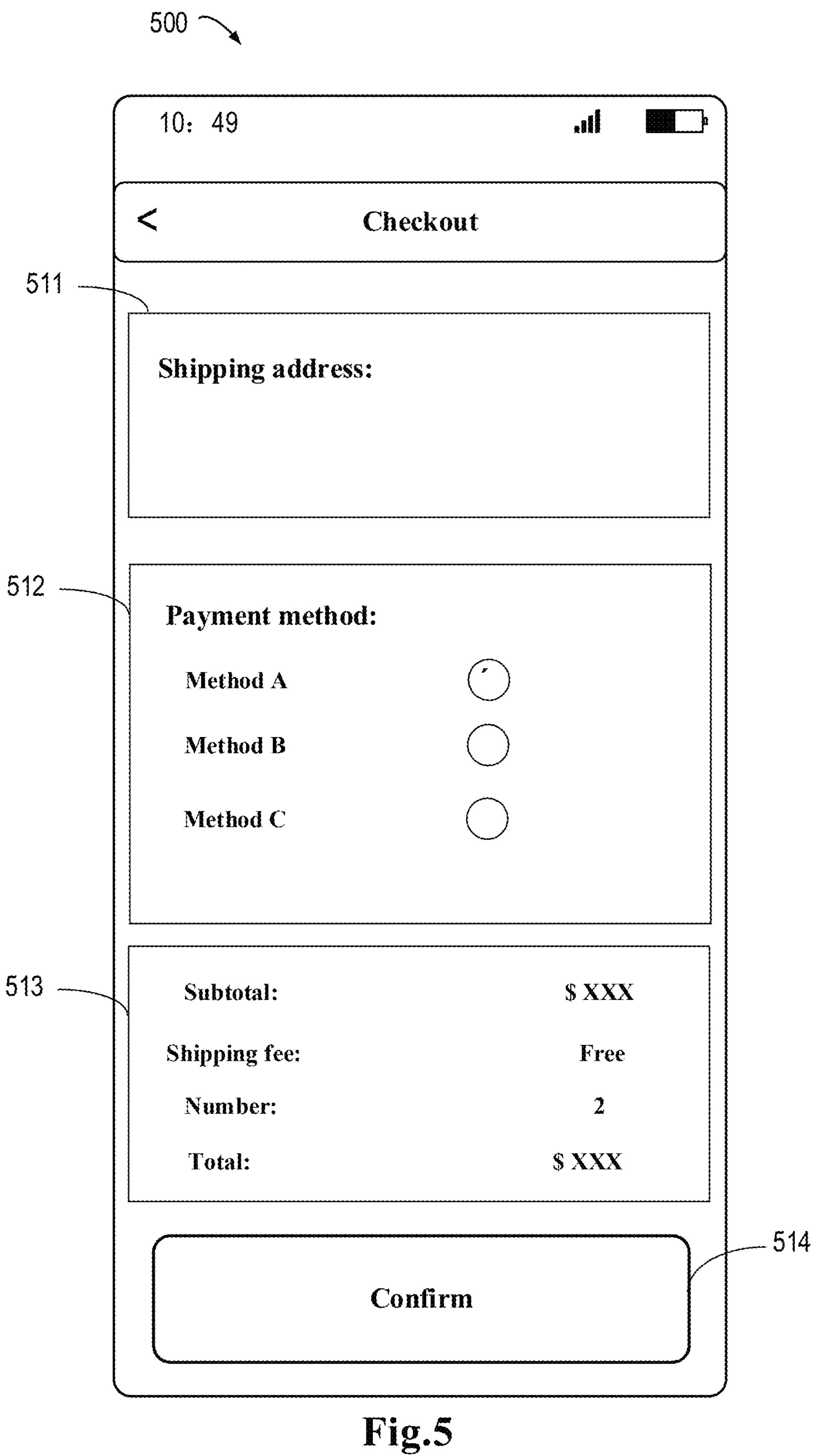
FIG. 5 illustrates an example interface for checking out items according to some embodiments of the present disclosure.

FIG. 5 illustrates an example interface 500 for checking out items according to some embodiments of the present disclosure. As shown therein, the interface 500 includes an area 511 for confirming or modifying a shipping address, an area 512 for confirming or selecting a payment method, an area 513 for displaying checkout information, and an area 514 for confirming the payment. By clicking or taping the area 514, the user may perform a payment operation and complete consumption of the items in the live cart.

An example process of shopping on a live streaming channel has been described above, including switching from the interface 300 for selecting an item from a live streaming channel to the cart interface 400, and further to the checkout interface 500. In some embodiments, the user may bypass the cart interface and proceed directly to the checkout from the item selection interface for the live streaming channel. This can simplify the user operations and improves the user experience.

Figure 6:
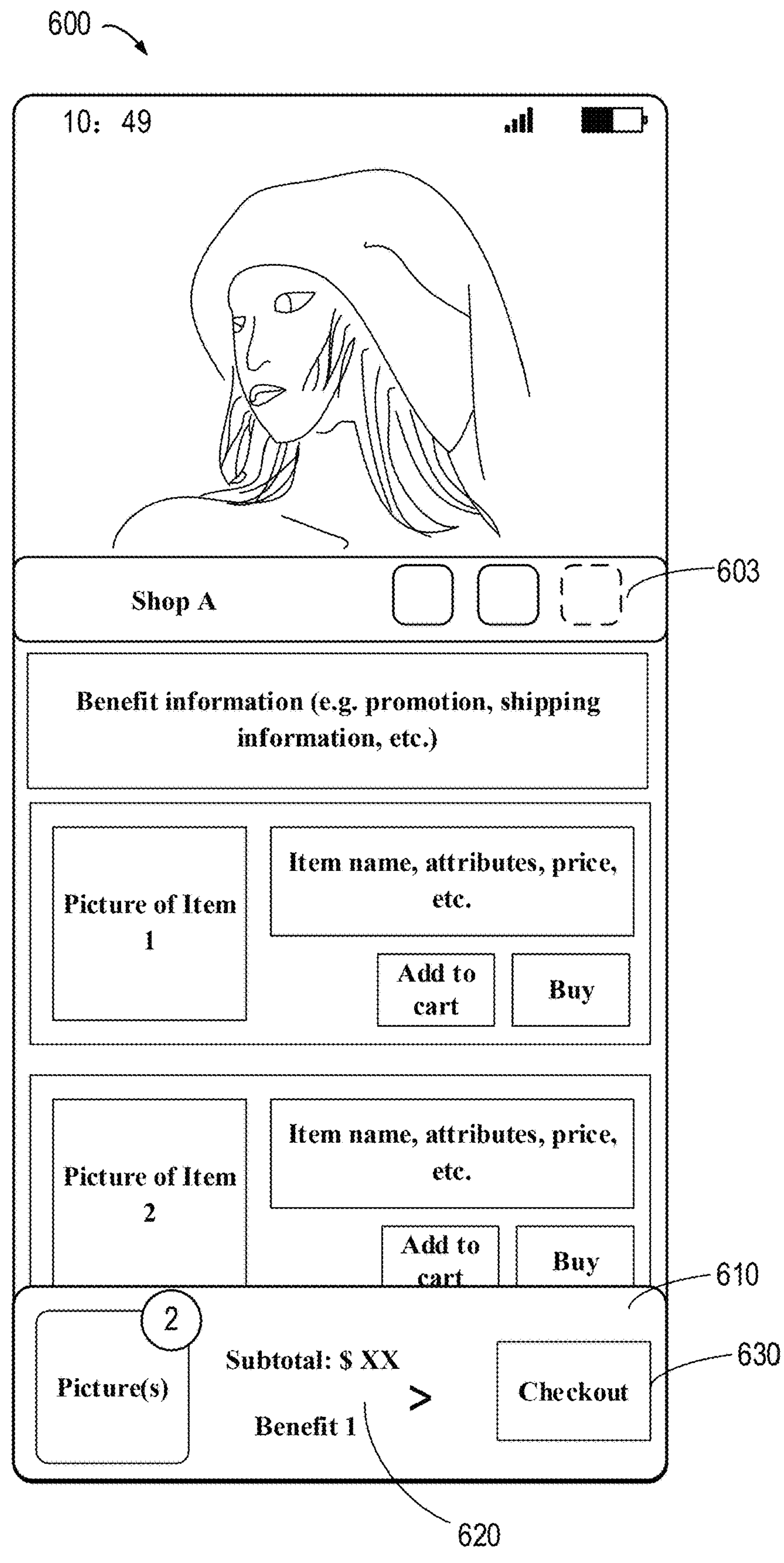
FIG. 6 illustrates an example interface for live streaming shopping according to some embodiments of the present disclosure, including a further example of the interactive element for the live cart.

FIG. 6 illustrates an example interface 600 for live streaming shopping according to some embodiments of the present disclosure, including a further example of the interactive element for the live cart. The user may select an item of the current live streaming channel on the interface 600, and add it to the cart. As shown therein, the interface 600 includes a control 630 linked to the checkout interface in which checkout of the items in the cart can be confirmed. Upon receiving a user operation on the second control, the interface 600 may switch to the interface 500 as shown in FIG. 5, to achieve quick checkout.

To enable a user to perform quick checkout, the interface 600 may further include a control 620 for displaying summary information of the item that has been added to the art. For example, the summary information may include price information, number, benefit information, and the like, of the item(s) that has been added to the cart. In this way, the user can directly obtain, from the interface 600, the information about the item(s) that has been added to the cart, to decide whether to check out the item directly, without the additional step of switching to the cart interface. In some embodiments, the control 620 may be linked to the cart interface, and when the user interacts with the control 620, the interface 600 may switch to the cart interface, for example, the interface 400 as shown in FIG. 4. In some embodiments, an image or a symbol (e.g. ">") of a hotspot (i.e., with interactive capability) may be displayed in or near the control 620, to indicate that the user can interact with it.

Similar to the interface 300, the interface 600 may include a cart icon 603 positioned above the list of items, which is linked to the interface of the live cart. In some embodiments, when the cart contains item(s), the cart icon 603 may not be displayed. Alternatively, the cart icon 603 may always be displayed, regardless whether the cart contains an item or not.

The interfaces and the interaction processes for live streaming shopping according to the embodiments of the present disclosure have been described with reference to FIGS. 1-6. Compared with the existing full cart for all the live streaming channels, the embodiments of the present disclosure provide a cart dedicated to a live streaming channel, and corresponding interfaces and interaction processes. In this way, information of interest to users can be displayed effectively during live streaming shopping, thus improving the user experience.

Figure 7:
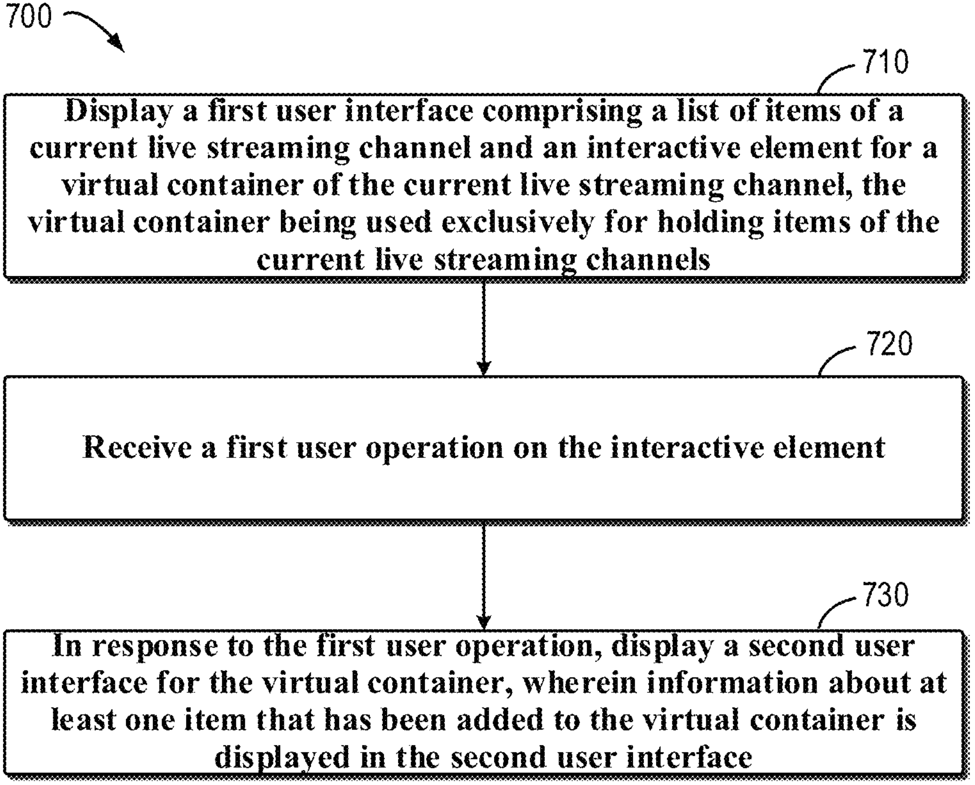
FIG. 7 illustrates an example flowchart of an information processing method according to some embodiments of the present disclosure.

FIG. 7 illustrates a flowchart of an information processing method 700 according to some embodiments of the present disclosure. The method 700 may be implemented by any electronic device having a computing and displaying capability. At block 710, a first user interface is displayed, which includes a list of items of a current live streaming channel and an interactive element for a virtual container of the current live streaming channel, where the virtual container is used exclusively for holding items of the current live streaming channels. At block 720, a first user operation on the interactive element is received. At block 730, in response to the first user operation, a second user interface for the virtual container is displayed, where information about at least one item that has been added to the virtual container is displayed in the second user interface.

In some embodiments, the interactive element includes a first control linked to the second user interface, and the first user operation includes an interactive operation with the first control. For example, the first control may be the control 320 in FIG. 3 or the control 620 in FIG. 6.

In some embodiments, summary information about the at least one item that has been added to the virtual container is displayed on the first control. The summary information may at least include price information of at least one item.

In some embodiments, the interactive element further includes a second control linked to a third user interface, and the method 700 further includes: receiving a second user operation on the second control; and in response to the second user operation, displaying the third user interface in which the at least one item is to be checked out. For example, the second control may be the control 630 in FIG. 6.

In some embodiments, the second user interface includes a third control linked to the third user interface, which prompts to check out items of the current live streaming channel. For example, the third control is the control 514 in FIG. 5.

In some embodiments, the method 700 may further include: in response to determining that the virtual container is empty, refraining from displaying the interactive element.

In some embodiments, the method 700 may further include: receiving a third user operation of adding an item of the current live streaming channel to the virtual container; and in response to the third user operation, displaying, on the first user interface, the interactive element.

In some embodiments, the interactive element occupies a bottom the first user interface.

In some embodiments, the first user interface further comprises: an icon for the virtual container positioned above the list of items, the icon being linked to the second user interface. The icon may be the icon 303 in FIG. 3 or the icon 603 in FIG. 6.

In some embodiments, the method 700 may further include: in response to determining that the virtual container is not empty, refraining from displaying the icon.

In some embodiments, the virtual container is a first virtual container, and the second user interface further comprises a fourth control linked to a second virtual container for holding items of a plurality of live streaming channels comprising the current live streaming channel.

In some embodiments, the interactive element may further include pictures of the at least one item arranged in a partially overlapping manner.

In some embodiments, a number of the at least one item is displayed in vicinity of the pictures.

In some embodiments, the interactive element may further include: benefit information about the current live streaming channel, the benefit information being used for arousing user interest to trigger a user operation on the interactive element.

In some embodiments, the virtual container is a cart.

Figure 8:
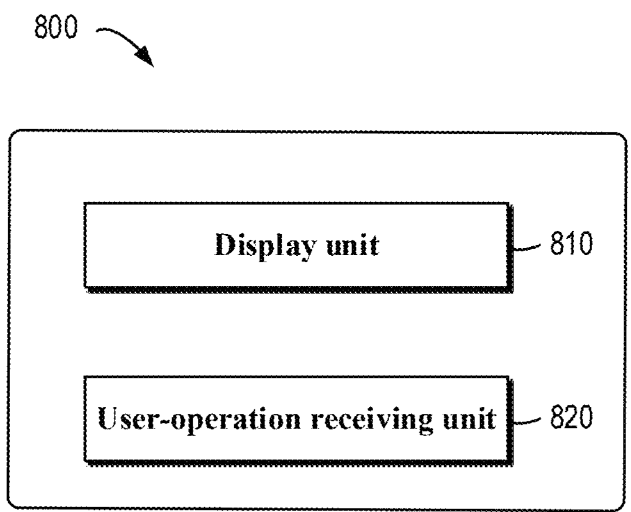
FIG. 8 illustrates an example block diagram of an information processing apparatus according to some embodiments of the present disclosure.

FIG. 8 illustrates a schematic block diagram of an information processing apparatus 800 according to embodiments of the present disclosure. As shown therein, the apparatus 800 includes: a display unit 810 configured to display a first user interface comprising a list of items of a current live streaming channel and an interactive element for a virtual container of the current live streaming channel, the virtual container being used exclusively for holding items of the current live streaming channels. The apparatus 800 further includes a user-operation receiving unit 820 configured to receive a first user operation on the interactive element. The display unit 810 is further configured, in response to the first user operation, to display a second user interface for the virtual container, and information about at least one item that has been added to the virtual container is displayed in the second user interface.

It is worth noting that more elements as shown in FIGS. 1-7 can be implemented by the apparatus 800 as shown in FIG. 8. For example, the apparatus 800 may include more modules or units to implement the elements described above, or some units or modules shown in FIG. 8 can be further configured to implement the elements described above. Details are omitted herein for brevity.

Figure 9:
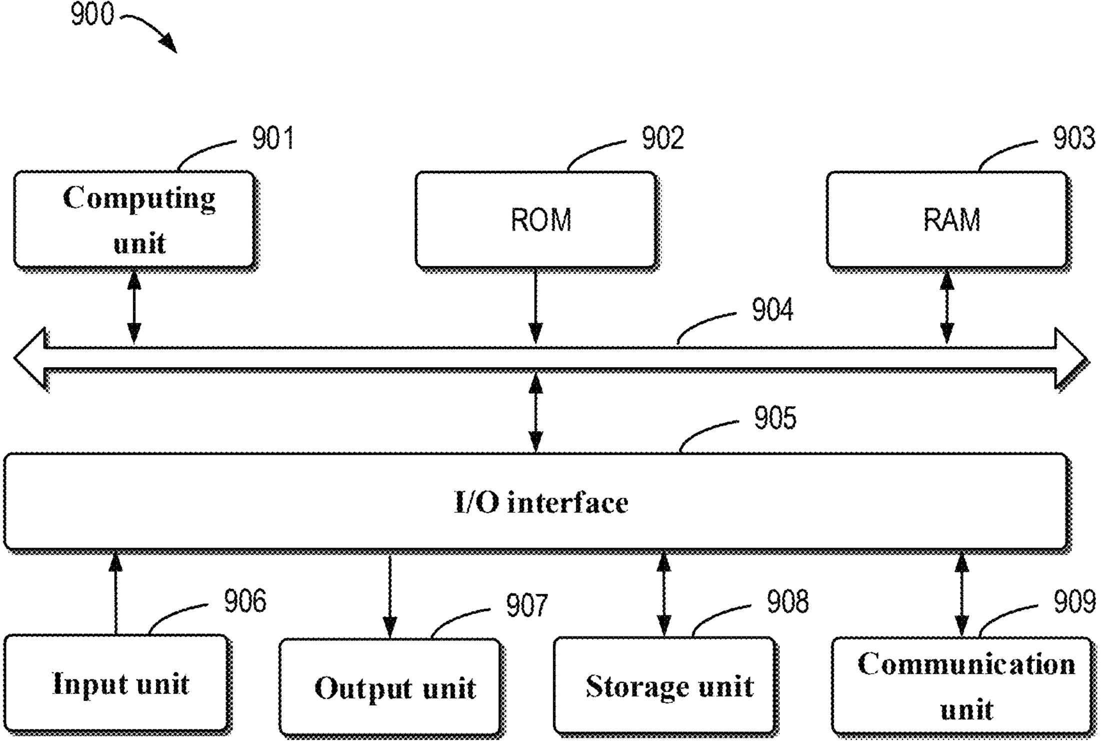
FIG. 9 illustrates a block diagram of an electronic device that can implement some embodiments of the present disclosure.

FIG. 9 illustrates an example block diagram of an example device 900 that can implement embodiments of the present disclosure. As shown therein, the device 900 may include a computing unit 901 which can execute various actions and processing based on programs stored in a Read Only Memory (ROM) 902 or a program loaded from a storage unit 906 to a Random Access Memory (RAM) 903. RAM 903 stores therein various programs and data required for operations of the electronic device 900. The computing unit 901, the ROM 902 and the RAM 903 are connected to one another via a bus 904. An input/output (I/O) interface 905 is also connected to the bus 904.

A plurality of components in the device 900 may be connected to the I/O interface 905, including: an input unit 906 including, for example, a touchscreen, a touch pad, a keyboard, a mouse, and the like; an output unit 907 including various types of displays (e.g. an interactive display such as a touchscreen); a storage unit 908 including, for example, a magnetic disk, a compact disc, or the like; and a communication unit 909, for example, a network card, a modem, a wireless communication transceiver, or the like. The communication unit 909 can allow the device 900 to exchange information/data with other devices through a computer network such as Internet, and/or various kinds of telecommunication networks.

The computing unit 901 may be various types of general purpose and/or specific purpose processing components having a processing and computing capability. Some examples of the computing unit 901 include, but are not limited to, a Central Processing Unit (CPU), a Graphics Processing Unit (GPU), various types of specific-purpose Artificial Intelligence (AI) computing chips, various types of computing units having machine learning model algorithms run thereon, a Digital Signal Processor (DSP), any appropriate processor, controller or microcontroller, and the like. The computing unit 901 can execute various methods and processing described above, for example, the method 700. For example, the method 700 may be implemented as computer software programs that are tangibly included in a machine readable medium, e.g., the storage unit 908. In some embodiments, part or all of the computer programs may be loaded and/or mounted onto the device 900 via ROM 902 and/or communication unit 909. When the computer program is loaded to the RAM 903 and executed by the computing unit 901, one or more steps of the method 700 as described above may be executed. Alternatively, in other embodiments, the processing unit 901 may be configured in any other appropriate manners (for example, by means of firmware) to perform the method 700.

In some embodiments, the method and process described above may be implemented as a computer program product. The computer program product may include a computer readable storage medium having stored thereon computer readable program instructions for performing various aspects of the present disclosure.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a Random Access Memory (RAM), a Read-Only Memory (ROM), an Erasable Programmable Read-Only Memory (EPROM or Flash memory), a Static Random Access Memory (SRAM), a portable Compact Disc Read-Only Memory (CD-ROM), a Digital Versatile Disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals sent through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, Field-Programmable Gate Arrays (FPGAs), or Programmable Logic Arrays (PLAs) may execute the computer readable program instructions by utilizing state information of the computer readable program instructions to personalize the electronic circuitry, in order to perform aspects of the present disclosure.

These computer readable program instructions may be provided to a processing unit of a general purpose computer, special purpose computer, or other programmable data processing device to produce a machine, such that the instructions, when executed via the processing unit of the computer or other programmable data processing device, create apparatuses for implementing the functions/actions specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored thereon includes an article of manufacture including instructions which implement aspects of the functions/actions specified in the flowchart and/or block diagram block or blocks.

The computer readable program instructions may also be loaded onto a computer, other programmable data processing devices, or other devices to cause a series of operational steps to be performed on the computer, other programmable devices or other devices to produce a computer implemented process, such that the instructions which are executed on the computer, other programmable devices, or other devices implement the functions/actions specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which includes one or more executable instructions for implementing the specified logical function(s). In some alternative implementations, the functions noted in the block may occur out of the order noted in the images. For example, two blocks in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method, comprising:

displaying a first user interface comprising a list of items associated with a current live streaming channel and an interactive element for a virtual container of the current live streaming channel, the virtual container being used exclusively for holding items of the current live streaming channels;

receiving a first user operation on the interactive element;

in response to the first user operation, displaying a second user interface for the virtual container, wherein information about at least one item that has been added to the virtual container is displayed in the second user interface; and wherein the method further comprises:

in response to detecting that the virtual container is empty, refraining from displaying the interactive element.

2. The method of claim 1, wherein the interactive element comprises a first control linked to the second user interface, and the first user operation comprises an interactive operation with the first control.

3. The method of claim 1, wherein summary information about the at least one item that has been added to the virtual container is displayed on the first control.

4. The method of claim 2, wherein the interactive element further comprises a second control linked to a third user interface, and wherein the method further comprises:

receiving a second user operation on the second control; and in response to the second user operation, displaying the third user interface in which the at least one item is to be checked out.

5. The method of claim 4, wherein the second user interface comprises a third control linked to the third user interface, the third control prompting to check out items of the current live streaming channel.

6. The method of claim 1, further comprising:

receiving a third user operation of adding an item of the current live streaming channel to the virtual container; and in response to the third user operation, displaying, on the first user interface, the interactive element.

7. The method of claim 1, wherein the interactive element occupies a bottom the first user interface.

8. The method of claim 1, wherein the first user interface further comprises: an icon for the virtual container positioned above the list of items, the icon being linked to the second user interface.

9. The method of claim 8, further comprising:

in response to determining that the virtual container is not empty, refraining from displaying the icon.

10. The method of claim 1, wherein the virtual container is a first virtual container, and the second user interface further comprises a fourth control linked to a second virtual container for holding items of a plurality of live streaming channels comprising the current live streaming channel.

11. The method of claim 1, wherein the interactive element further comprises pictures of the at least one item arranged in a partially overlapping manner.

12. The method of claim 11, wherein a number of the at least one item is displayed in vicinity of the pictures.

13. The method of claim 1, wherein the interactive element further comprises:

benefit information about the current live streaming channel, the benefit information being used for arousing user interest to trigger a user operation on the interactive element.

14. The method of claim 1, wherein the virtual container is a cart.

15. An electronic device, comprising:

a processing unit; and a memory coupled to the processing unit and having instructions stored thereon, wherein the instructions, when executed by the processing unit, cause the electronic device to perform actions, the actions comprising:

displaying a first user interface comprising a list of items associated with a current live streaming channel and an interactive element for a virtual container of the current live streaming channel, the virtual container being used exclusively for holding items of the current live streaming channels;

receiving a first user operation on the interactive element;

in response to the first user operation, displaying a second user interface for the virtual container, wherein information about at least one item that has been added to the virtual container is displayed in the second user interface; and wherein the actions further comprise:

in response to detecting that the virtual container is empty, refraining from displaying the interactive element.

16. The electronic device of claim 15, wherein the interactive element comprises a first control linked to the second user interface, and the first user operation comprises an interactive operation with the first control.

17. The electronic device of claim 15, wherein summary information about the at least one item that has been added to the virtual container is displayed on the first control.

18. The electronic device of claim 16, wherein the interactive element further comprises a second control linked to a third user interface, and wherein the method further comprises:

receiving a second user operation on the second control; and in response to the second user operation, displaying the third user interface in which the at least one item is to be checked out.

19. A non-transitory computer storage medium comprising computer executable instructions, wherein the computer executable instructions, when executed by a device, cause the device to perform actions, the actions comprising:

displaying a first user interface comprising a list of items associated with a current live streaming channel and an interactive element for a virtual container of the current live streaming channel, the virtual container being used exclusively for holding items of the current live streaming channels;

receiving a first user operation on the interactive element;

in response to the first user operation, displaying a second user interface for the virtual container, wherein information about at least one item that has been added to the virtual container is displayed in the second user interface; and wherein the actions further comprise:

in response to detecting that the virtual container is empty, refraining from displaying the interactive element.

20. The non-transitory computer storage medium according to claim 19, wherein the interactive element comprises a first control linked to the second user interface, and the first user operation comprises an interactive operation with the first control.

* * * * *